United States Patent [19]

Hoffman

[11] Patent Number: 5,226,717
[45] Date of Patent: Jul. 13, 1993

[54] REFRIGERATOR DOOR SHELF RETAINER ASSEMBLY

[75] Inventor: Charles J. Hoffman, Kentwood, Mich.

[73] Assignee: White Consolidated Industries, Inc., Cleveland, Ohio

[21] Appl. No.: 842,430

[22] Filed: Feb. 27, 1992

[51] Int. Cl.⁵ ............................................. A47B 96/00
[52] U.S. Cl. ................................. 312/405.1; 312/321.5; 248/221.3; 211/153
[58] Field of Search ............... 312/405.1, 405, 406, 312/408, 321.5; 248/221.3, 221.4, 235; 211/153

[56] References Cited

U.S. PATENT DOCUMENTS

| | | | |
|---|---|---|---|
| 3,469,711 | 9/1969 | Swaneck et al. | 312/321.5 |
| 3,628,762 | 12/1971 | Williams | 248/235 |
| 3,652,032 | 3/1972 | Eros et al. | |
| 4,301,986 | 11/1981 | Morel | 248/221.3 |
| 4,352,478 | 10/1982 | Loew | 248/221.3 |
| 4,389,759 | 6/1983 | Yuda | 248/221.4 |
| 4,736,997 | 4/1988 | Besore et al. | 312/408 |
| 4,798,425 | 1/1989 | Armstrong et al. | 312/321.5 |
| 4,815,685 | 3/1989 | Roberts et al. | |

Primary Examiner—Victor N. Sakran
Attorney, Agent, or Firm—Pearne, Gordon, McCoy & Granger

[57] ABSTRACT

A shelf front retainer end cap has a spring clip to permit easy assembly and removal of a retainer assembly. The end cap fits into a rectangular aperture in a refrigerator door panel. A front flange abuts the front surface of the panel around the aperture. The spring is a slightly inclined ramp with a hook at the end and has a fixed end attached near the front of the cap. It extends through the aperture and the hook engages the rear surface of the panel. The retainer assembly is removed by depressing the clip and pulling the cap from the aperture.

14 Claims, 3 Drawing Sheets

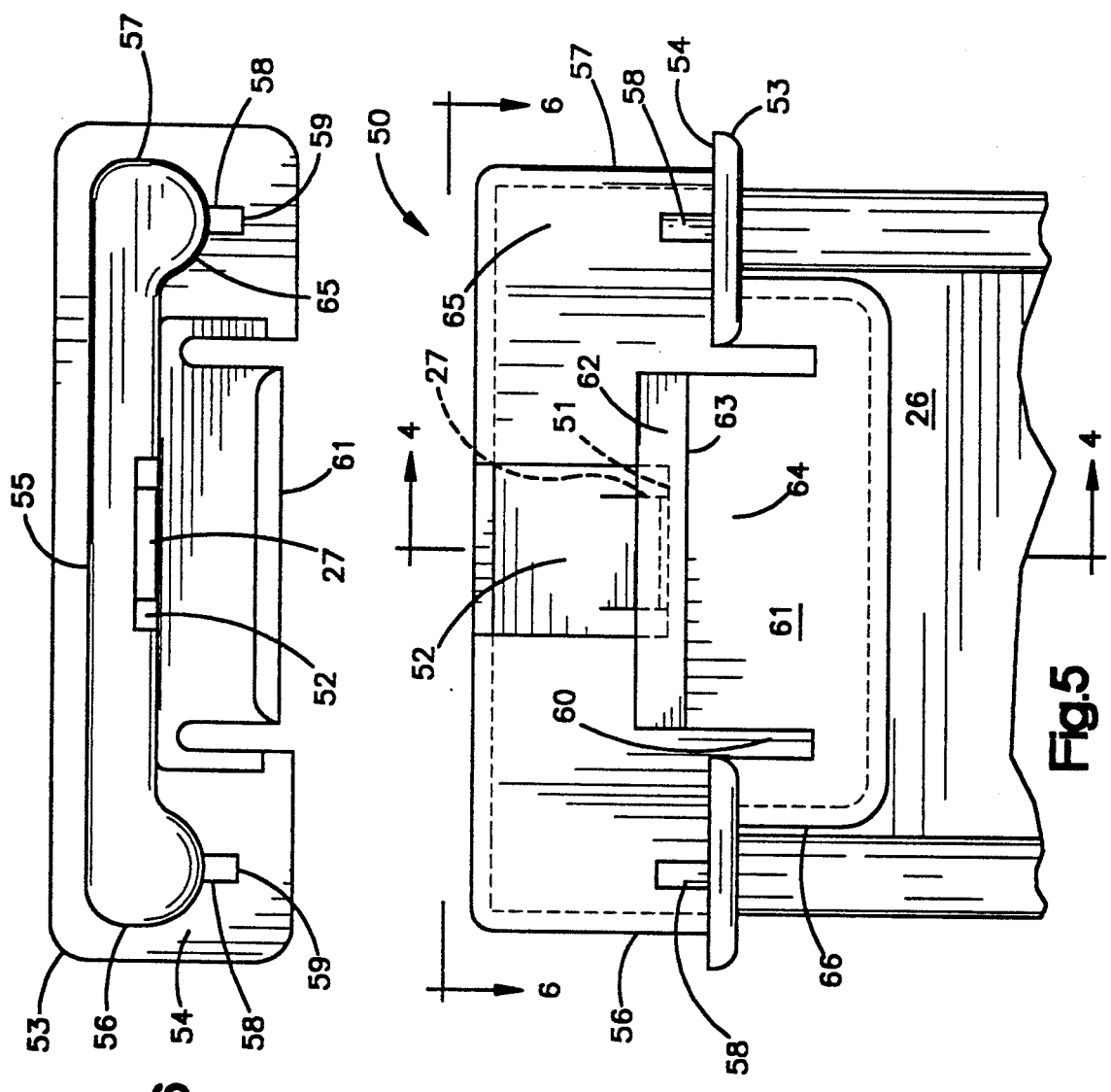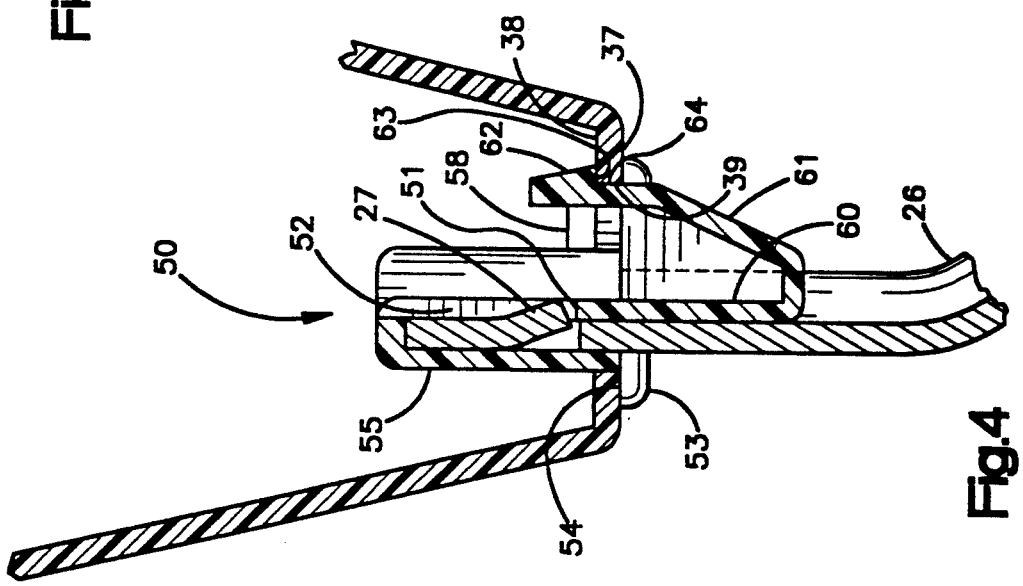

REFRIGERATOR DOOR SHELF RETAINER ASSEMBLY

BACKGROUND OF THE INVENTION

1. Field of the Invention

This invention relates generally to a retainer assembly for holding items on a refrigerator door shelf and more particularly to a removable retainer assembly which can be rigidly mounted on the door panel.

2. Description of Related Art

Household refrigerators are generally provided with a plurality of shelves which extend from or are integral with the refrigerator door liner. These door shelves provide for better utilization of refrigerator storage space, convenient organization of refrigerated items, and easy access to stored items. A typical refrigerator door will have specialty shelves for retaining such items as eggs or butter, and one or more flat shelves for retaining cans, jars, bottles and the like. Lateral support of stored items retained on the flat shelves is achieved by providing a front retainer or a vertical wall extending in front of each shelf to prevent the items from tipping or sliding off the shelves when the refrigerator door is opened or closed.

Pending U.S. patent application Ser. No. 07/780,709 (Adjustable Refrigerator Door Shelf Retainer, filed Oct. 18, 1991 by RODGERS et al and assigned to the assignee of the present invention) describes a horizontally adjustable retainer which is mounted in a rectangular aperture in the refrigerator door panel. The retainer is adjustable to differently spaced positions with respect to the door panel to accommodate items of different sizes which may be placed on the shelf.

U.S. Pat. No. 3,652,032 to EROS et al discloses a removable front shelf assembly using spring clips inserted into rectangular apertures. The EROS arrangement has a U-shaped spring clip with two flanges which abut the rear surface of the door panel. The spring clip also has two front flanges which abut the front surface of the door panel. The fixed end of the spring is located in the aperture and the spring extends forwardly to where it engages the rear surface. A flange which extends further forwardly is provided to facilitate depression of the flexible spring for removal.

U.S. Pat. No. 4,815,685 to ROBERTS et al discloses a removable front shelf assembly using spring clips inserted into rectangular apertures. The ROBERTS design has a relatively straight spring clip with one end fixed to two legs which extend through the aperture. A single flange abuts the front surface of the door panel and a single flange abuts the rear face of the panel. The ROBERTS assembly fits on the end of a straight retainer to form a right angle. The fixed end of the spring is located in the aperture and the spring extends forwardly to where it engages the rear surface. A flange which extends further forwardly is provided to facilitate depression of the flexible spring for removal.

SUMMARY OF THE INVENTION

The present invention provides an improved mounting for a shelf retainer for holding articles on a refrigerator door shelf which has a simple construction, has simple installation and removal, is secure and is not susceptible to unwanted removal. The present invention has a molded cap which fits on the end of a retainer which is installed across the front of a refrigerator door shelf to hold objects on the shelf when the door is opened and closed. The retainer has a tab which engages the edge of a slot in the cap to secure the cap on the retainer. The cap has a unitary spring member with a hook at its end. The stationary end of the spring member is at the front end of the cap. This cap fits into a rectangular aperture in the front panel of the refrigerator until a flange around the front part of the cap abuts the front panel. When installed, most of the cap is not visible. The hook on the spring engages the rear face of the front panel to provide a secure fit.

This invention provides a simpler, more secure installation than the prior art and uses less material. The cap and retainer are removed by depressing the spring and pulling the cap from the panel aperture. The assembly is intended to be permanently installed, but is easily removed, if necessary, for servicing or replacement, by one who is familiar with its operation. Because the spring is relatively rigid and has its movable end inserted in the aperture, it is not prone to accidental removal. The consumer will generally not need to remove the retainer assembly, thus the means of removal are not obvious to the consumer. The rectangular apertures which receive the end caps are identical to those which receive the adjustable retainers as disclosed in the aforementioned application Ser. No. 07/780,709 so that the fixed retainer assemblies of the present invention are interchangeable with those adjustable retainers.

BRIEF DESCRIPTION OF THE DRAWINGS

FIG. 4 is an enlarged sectional plan view of one installed end cap of the retainer assembly taken along 4—4 of FIG. 5;

FIG. 5 is a side view of one end cap of the retainer assembly; and

FIG. 6 is a view of the cap and retainer assembly along 6—6 of FIG. 5.

DESCRIPTION OF THE PREFERRED EMBODIMENT

Figure 1:
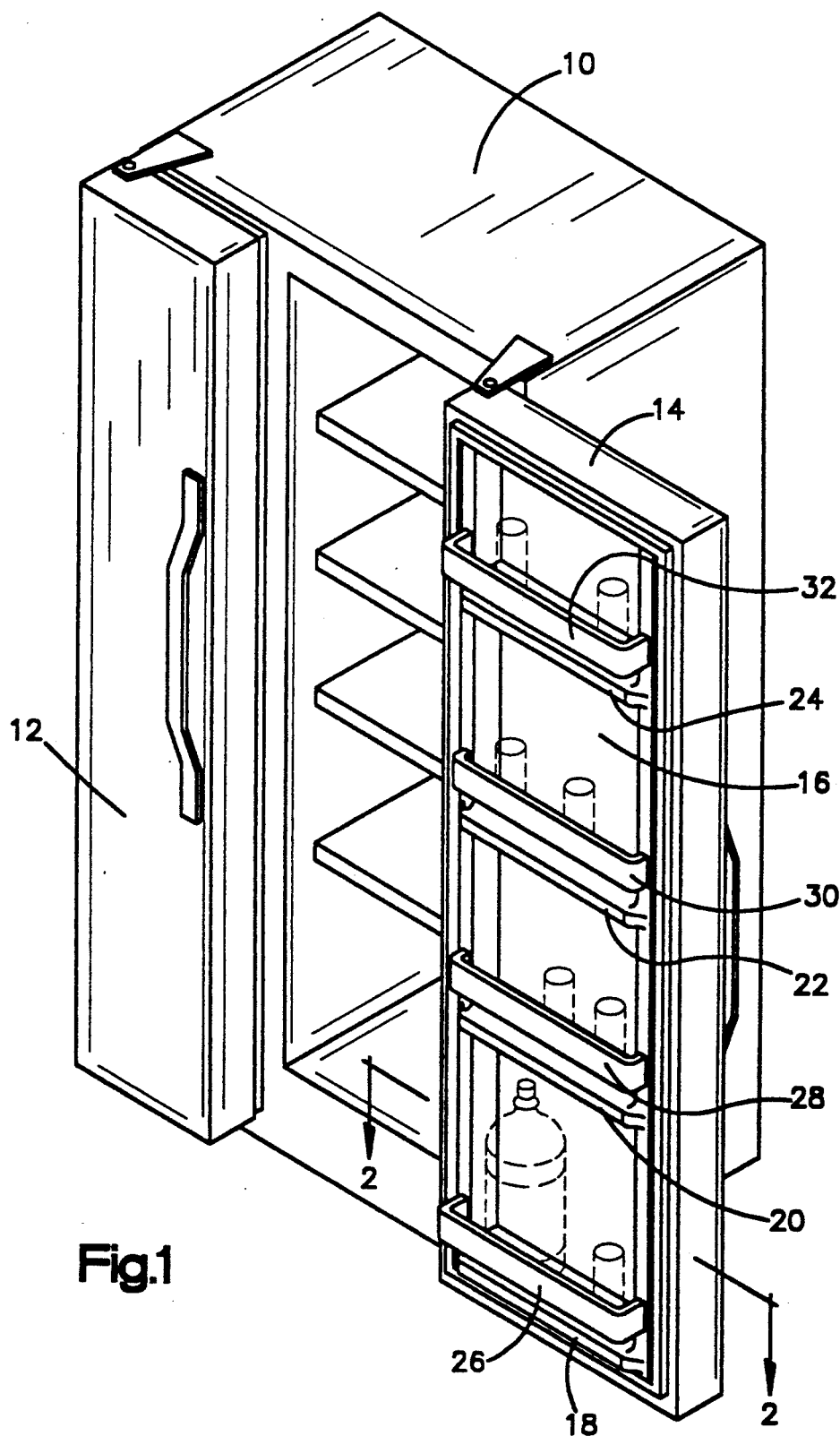
FIG. 1 is a perspective view of a refrigerator showing door shelf retainer assemblies according to the present invention.

Referring to FIG. 1, a dual compartment refrigerator 10 having two pivotally hinged, side-by-side doors is shown with the right or food compartment front door 14 in the open position and the left or freezer compartment front door 12 in the closed position. The right front door has an inner door liner panel 16 formed from a suitable plastic sheet, preferably made from an acrylonitrile-butadiene-styrene copolymer (ABS) or from a polyolefin. The door liner panel is formed to include integral shelves 18, 20, 22 and 24 for storing refrigerated food items. Each shelf has an associated retainer 26, 28, 30 and 32 for providing lateral support for items being stored on the shelves, and, in particular, for preventing stored items from tipping or sliding off the shelves when the refrigerator door is swung open or closed.

Figure 2:
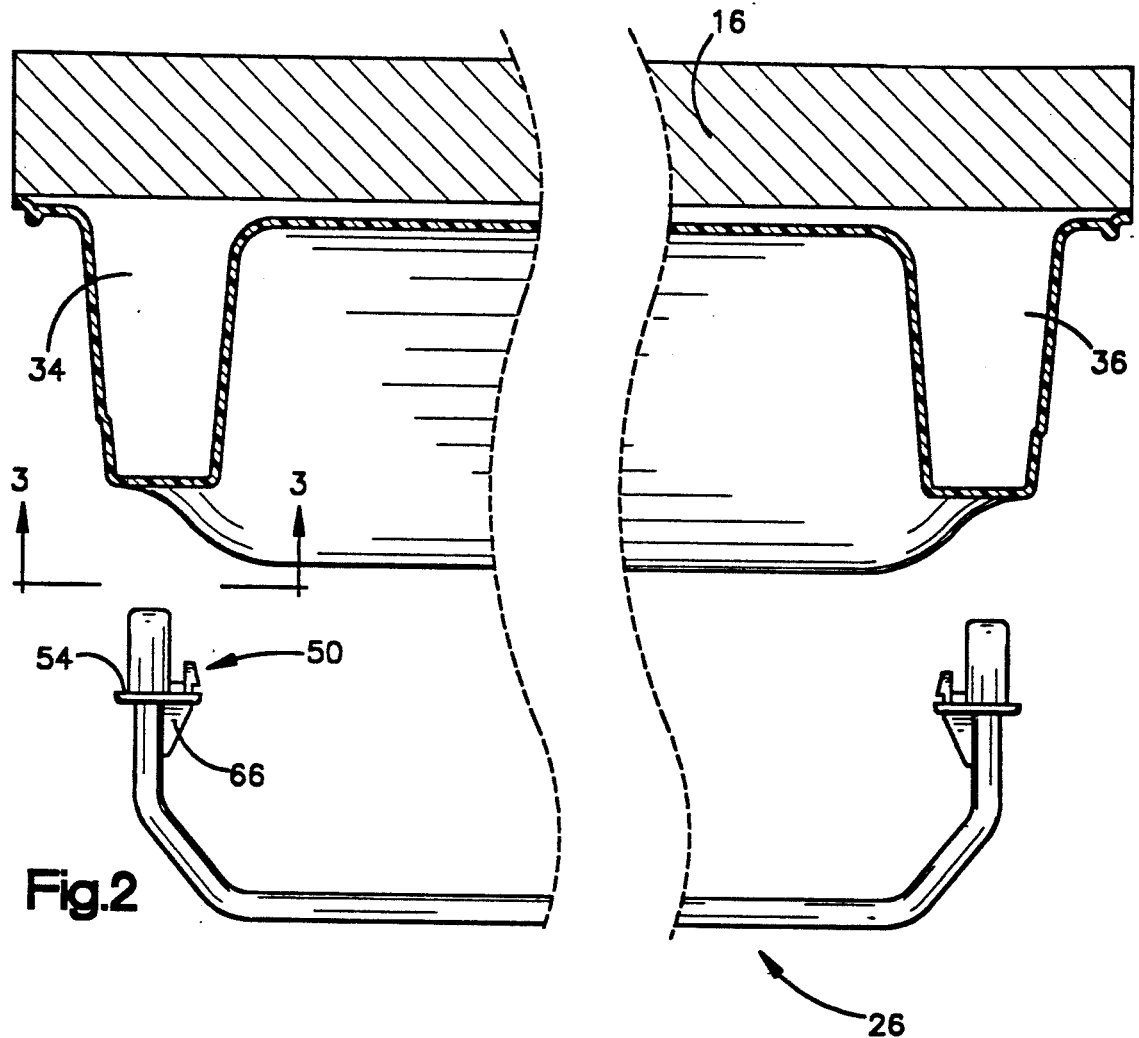
FIG. 2 is a plan view of a section of a shelf formed in a refrigerator inner liner panel taken along 2—2 and of the retainer assembly prior to installation.

FIG. 2 shows a cross-section of the inner refrigerator door panel 16 which has parallel protruding side walls 34 and 36 which extend vertically along the height of the refrigerator door and with the spacing between the side walls defining the length of the door shelves. The side walls are provided with substantially vertically elongated rectangular apertures 45 for snugly receiving the ends of, and for supporting, an assembly of retainer 26 and its end caps 50. The retainer 26 is preferably an elongated generally planar member. The ends of the retainer 26 are curved as shown, but they can also be, for example, straight, bent or comprised of a separate piece attached to the generally straight member. The retainer 26 is commonly made of aluminum or other metal, however, other materials such as plastic can be used. As indicated by the break-away lines in FIG. 2, the shelves and retainer may be of any desired length depending on the configuration and size of the refrigerator door.

Figure 3:
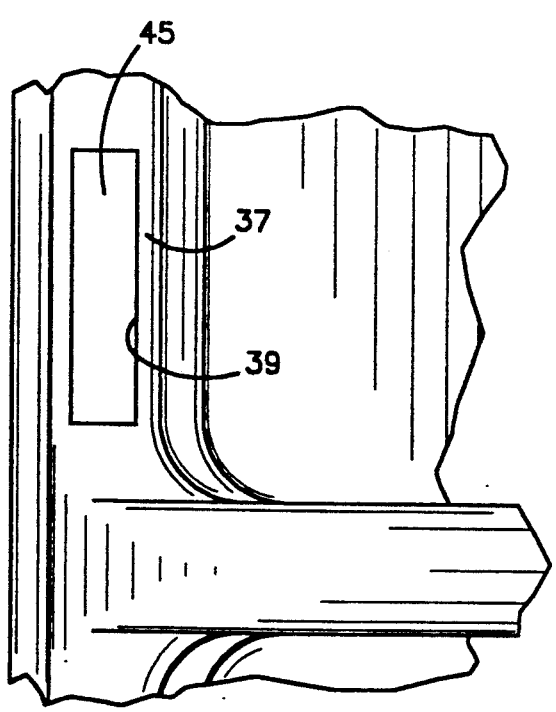
FIG. 3 is a front elevation of one protruding side wall of the shelf taken along 3—3 of FIG. 2 with the retainer assembly removed.

As shown in FIGS. 3 and 4, the front part of the side wall 34 around the aperture has a front surface 37, a rear surface 38 and an inner edge 39. Typically, the aperture is punched through the liner panel 16 after the panel is molded. The aperture 45 can be of a standard size for receiving other fixed retainer assemblies or an adjustable assembly such as the one disclosed in pending application Ser. No. 07/780,709.

FIGS. 4, 5 and 6 show an end cap 50 in detail. The end cap fits over the end of the retainer 26. The end cap 50 is secured to the retainer 26 by a tab 27 on the retainer 26 which engages an edge 51 of a generally rectangular aperture 52 of the end cap. Other locking means to secure the cap can be used including a simple friction fit.

The end cap 50 and retainer 26 are inserted into the aperture 45. A rear surface 54 of a flange 53 around the front part of the end cap abuts the front surface 37 of the side wall 34 preventing further insertion of the end cap. In the installed position of FIG. 4, part of an outside surface 55 of the end cap abuts part of the inner edge 39 of the aperture 45. Parts of top and bottom surfaces 56 and 57 abut top and bottom parts of inner edge 39 of the aperture. Projections 58 on the rear surface 54 of flange 53 have inner edges 59 which abut or are in proximity to the inside edge 39 of the aperture 45 to prevent significant rotation of the end cap 50 in the aperture 45. Alternatively, the inner surface 65 of the end cap can abut the inner edge 39, however, this requires more material for manufacture of the end cap.

The end cap 50 has an integral member 60 which extends forward beyond the front flange 53 along the inner face of the retainer 26. The forward extending member 60 can be reinforced with a reinforcing member 66 which is a web between the forward extending member 60 and the front flange 53 at either or both ends. Integral with this forwardly extending member 60 is a spring tab 61 having a fixed end near the front of the forward extending member 60 and a movable end with a hook means 62. The spring tab 61 has an inner surface 64 which is biased against the inner edge 39 of the aperture 45 in the installed position. The hook means 62 has a front edge 63 which engages the rear surface 38 of the side wall 34. This arrangement provides a stable fit of the retainer 26 and end cap 50 in the aperture 45 and prevents movement of the retainer in all directions.

The end cap 50 and retainer 26 assembly is removable by depressing the spring tab 61 so that the hook clears the rear surface 38 and pulling the assembly from the aperture 45.

The same assembly as described above is used at the opposite end of the retainer 26 and is installed in mirror image fashion to removably secure both ends of the retainer 26.

The present disclosure describes one embodiment of the invention, however, the invention is not limited to this embodiment. Other variations are contemplated to be within the spirit and scope of the invention and appended claims.

What I claim is:

1. A shelf front assembly for a panel forming a shelf with a bottom wall, the panel having a front face with a rear surface and a front surface and having apertures through the front face, said assembly having an elongated shelf front retainer having an end cap removably secured to the panel, said end cap comprising:
   a flange having a rear surface parallel with the front face; and
   a generally planar spring member having a fixed end at the forward part of the end cap and having a hook;
   said end cap being insertable into the panel aperture from the front such that the rear surface of the flange abuts the front surface of the front face of the panel and the spring member is biased against an inside edge of the panel aperture such that the hook engages the rear surface of the front face of the panel.

2. A shelf front assembly according to claim 1 wherein the aperture is rectangular.

3. A shelf front assembly according to claim 1 wherein the ends of the shelf front retainer are curved.

4. A shelf front assembly according to claim 1 wherein the flange is near the front of the cap.

5. A shelf front assembly according to claim 1 wherein the end cap has an aperture in the side of the end cap facing the shelf.

6. A shelf front assembly according to claim 5 wherein the shelf front retainer has a tab which is engagable with an edge of the end cap aperture.

7. A shelf front assembly according to claim 1 wherein the cap has a member extending forwardly from the front of the cap.

8. A shelf front assembly according to claim 7 wherein the spring member is fixed to the forward part of the forward extending member.

9. A shelf front assembly according to claim 8, wherein the junction of the forward extending member and spring member is flexible.

10. A shelf front assembly according to claim 7 wherein the forward extending member is a generally vertically oriented generally planar member.

11. A shelf front assembly according to claim 10 wherein the flange and forward extending member are integral with two reinforcing members which are perpendicular to the flange and perpendicular to the forward extending member.

12. A shelf front assembly according to claim 1 wherein the spring member is a cantilever.

13. A shelf front assembly according to claim 1, wherein the spring member has a depressible portion located forward of the flange so that the hook can be disengaged from the rear surface by depressing the depressible portion.

14. A shelf front assembly according to claim 1, wherein the end cap has a forwardly extending member to which the spring member is fixed forward of the flange to define a depressible portion so that the hook can be disengaged from the rear surface by depressing the depressible portion.

* * * * *